United States Patent Office.

HEINRICH AUGUST BERNTHSEN, OF MANNHEIM, AND PAUL JULIUS, OF LUDWIGSHAFEN, GERMANY, ASSIGNORS TO THE BADISCHE ANILIN AND SODA FABRIK, OF LUDWIGSHAFEN, GERMANY.

DISAZO ORANGE DYE AND PROCESS OF MAKING SAME.

SPECIFICATION forming part of Letters Patent No. 631,611, dated August 22, 1899.

Application filed May 16, 1899. Serial No. 717,051. (No specimens.)

*To all whom it may concern:*

Be it known that we, HEINRICH AUGUST BERNTHSEN, a subject of the King of Prussia, German Emperor, residing at Mannheim, in the Grand Duchy of Baden, and PAUL JULIUS, a subject of the Emperor of Austria-Hungary, residing at Ludwigshafen-on-the-Rhine, in the Kingdom of Bavaria, Empire of Germany, doctors of philosophy, have invented new and useful Improvements in the Manufacture of New Substantive Coloring-Matters for Cotton, (for which application for Letters Patent has been made in Germany, No. B24,348, February 28, 1899; in England, No. 6,827, March 29, 1899; in France, No. 275,575, April 8, 1899, certificated Addition du Brevet No. 280,914,) of which the following is a specification.

Our invention consists in the production of substantive azo coloring-matters, which are mixed disazo dyes obtained by the combination of a tetrazo compound such as that derived from benzidin, first, with amido-R acid—that is, beta-naphthylamin-3.3'-disulfoacid—or with amido-F acid—that is, beta-naphthylamin-3.2'-disulfoacid, (see Täuber and Norman, *Derivate des Naphtalins*, pp. 26 and 27,) and as second component a nitrodiamin—namely, nitro-meta-phenylene-diamin or nitro-meta-toluylene-diamin.

Our new coloring-matter, however prepared, has a brilliant and beautiful orange shade, good coloring power, and great fastness against the action of light, acids, and chlorin. It is also more readily soluble in water than are some of the similar orange dyes hitherto known and used, and in spite of this greater solubility the affinity for the fiber is unimpaired. Its aqueous solution is orange-red in color. Hydrochloric acid added to the aqueous solution produces a brown precipitate. It dissolves in sulfuric acid, giving a deep-blue solution. On addition of sodium nitrite and hydrochloric acid to the aqueous solution a practically black mixture is obtained which turns dull red to brown on boiling.

The following example will serve to illustrate the manner in which the invention can best be carried into practical effect. Parts are by weight.

Example: Prepare in the well-known way an intermediate product from ninety-two parts of benzidin and one molecular proportion of the sodium salt of amido-R acid. Collect this intermediate product by filtering and pressing. Then stir it to a paste with a little water and introduce it into a solution of about eighty parts of nitro-meta-phenylene-diamin in about thirty thousand parts of water at a temperature of about 45° to 50° centigrade. Stir the mixture for about four hours, while maintaining the temperature at about 50° centigrade. Then gradually raise the temperature to 90° centigrade. When the color of the mixture is becoming light brownish red, add sufficient carbonate of soda to make the solution alkaline and precipitate the coloring-matter by means of common salt. Filter, press, and dry. The coloring-matter so obtained dyes cotton a brilliant red-orange without the aid of a mordant.

In the above example instead of the sodium salt of amido-R acid the corresponding salt of amido-F acid can be used to prepare the intermediate product, and instead of nitro-meta-phenylene-diamin nitro-meta-toluylene-diamin can be used.

Now what we claim is—

1. The new mixed disazo coloring-matter which can be obtained from benzidin, the herein-described beta-naphthylamin-disulfoacids and nitro-diamins, and which yields an orange-red solution in water, a deep-blue solution in sulfuric acid and on the addition of sodium nitrite and hydrochloric acid to the aqueous solution a dark practically black color which turns dull red to brownish on boiling.

2. The herein-described process for the manufacture of a new orange coloring-matter by combining the tetrazo compound of benzidin first with the herein-described beta-naphthylamin-disulfoacids and then combining the resulting intermediate compound with a nitro-meta-diamin herein mentioned, all substantially as described.

In testimony whereof we have hereunto set our hands in the presence of two subscribing witnesses.

HEINRICH AUGUST BERNTHSEN.
    PAUL JULIUS.

Witnesses:
 GUSTAV L. LICHTENBERGER,
 ADOLPH REUTLINGER.